United States Patent [19]

Roberts

[11] 4,268,283
[45] May 19, 1981

[54] FLUID CONTROL MEANS FOR GEOTHERMAL WELLS

[75] Inventor: Allen L. Roberts, Castle Rock, Colo.

[73] Assignee: W-K-M Wellhead Systems, Inc., Shreveport, La.

[21] Appl. No.: 108,763

[22] Filed: Dec. 31, 1979

[51] Int. Cl.³ .................. B01D 19/00; E21B 43/00
[52] U.S. Cl. ................................ 55/189; 55/204; 60/641 R; 166/97; 166/265
[58] Field of Search ............. 55/189, 204; 60/641; 137/268; 166/53, 90, 97, 208, 267

[56] References Cited

U.S. PATENT DOCUMENTS

| | | | |
|---|---|---|---|
| 2,830,666 | 4/1958 | Rhodes | 166/97 X |
| 3,330,356 | 7/1967 | Hottman | 166/267 X |
| 3,396,793 | 8/1968 | Piper et al. | 166/53 |
| 3,782,468 | 1/1974 | Kuwada | 166/267 |
| 3,863,714 | 2/1975 | Watson, Jr. | 166/53 |
| 3,988,896 | 11/1976 | Matthews | 60/641 |
| 4,044,830 | 8/1977 | Van Huisen | 166/267 |
| 4,089,175 | 5/1978 | Woinsky | 60/641 |
| 4,109,714 | 8/1978 | Greenlee et al. | 166/53 |
| 4,154,299 | 5/1979 | Winders | 166/97 X |

*Primary Examiner*—Robert H. Spitzer
*Attorney, Agent, or Firm*—Eugene N. Riddle; Stephen T. Belsheim

[57] ABSTRACT

A flow control valve 30 between a geothermal wellhead and a steam separator 22 is responsive to fluid pressure flowing through the wellhead to the separator and varies the flow rate to the separator 22 in response to the pressure to equalize the flow to the separator 22. A Y-type expansion spool 14 on the wellhead has a pair of auxiliary inlets 76, 78. One of the auxiliary inlets 76 has an auxiliary hanger 88 therein to suspend flexible tubing 94 for the injection of chemicals into the well and the other auxiliary inlet 78 provides an entrance 122 for taking a steam sample and permitting a tool to be inserted within the well.

6 Claims, 4 Drawing Figures

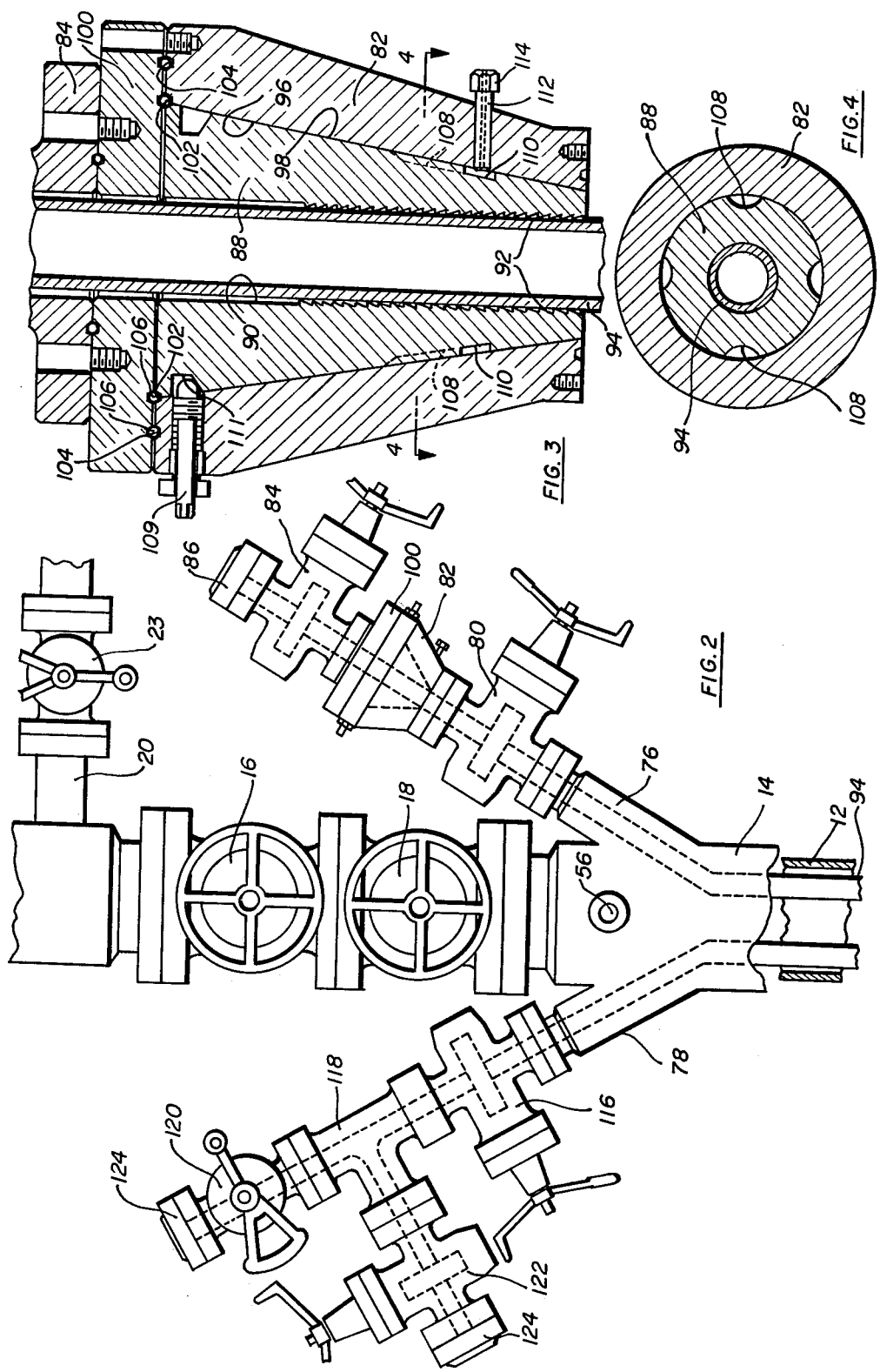

FLUID CONTROL MEANS FOR GEOTHERMAL WELLS

BACKGROUND OF THE INVENTION

This invention relates generally to geothermal wellheads and more particularly to geothermal wellheads utilized in combination with steam separators.

Steam separators are associated with geothermal wells to separate the water from the steam thereby to produce a high quality steam. In order to obtain maximum efficiency in the steam separator it is necessary to provide an even flow of steam and water to the separator. Normally, the fluid flow from a geothermal wellhead is somewhat erratic with varying fluid pressures and a constant surging within the well due to hot water flashes down the hole. Thus, it is highly desirable to equalize the flow to the separator so that such surges do not occur and to obtain maximum efficiency from the separator. A steam separator which will function satisfactorily in combination with the present invention is illustrated in copending application Ser. No. 031,722, filed Apr. 20, 1979.

In geothermal and other wells it is necessary to inject chemicals or other fluids within the well as might be necessary to break up formations or deposits in the well or well casing. Heretofore, auxiliary inlets have been provided in the wellhead to permit the injections of various fluids and tools.

SUMMARY OF THE INVENTION

A flow control valve located between a geothermal wellhead and a steam separator is responsive to fluid pressure in the wellhead which is generated by the flowing mixture of steam and water. The flow control valve is diaphragm operated and is operated automatically be controls responsive to a fluid pressure sensing line from the wellhead. This provides a generally even flow of water and steam to the separator from the geothermal wellhead, and results in maximum efficiency of the separator The expansion spool of the geothermal wellhead comprises a Y-shaped body which includes a pair of auxiliary bodies diverging from the main body. One of the auxiliary bodies has a tubing head with a tubing hanger therein supporting a flexible tubing for injecting chemicals and the like downhole. The tubing hanger is generally frusto-conical in cross section and is supported within the tubing head or bowl in face-to-face supporting contact. The outer periphery of the hanger has an annular groove and a plurality of upwardly extending flutes leading from the groove so that fluid or packing material can be injected into the groove and flutes to assist in any removal of the hanger from the tubing head. This is important due to the large variations in temperatures. The other auxiliary body is utilized to permit the insertion of a test probe within the well for acquiring flow samples for test purposes. In addition, other tools may be inserted from the second auxiliary diverter body if desired.

DESCRIPTION OF THE DRAWINGS

FIG. 2 is an enlarged sectional view of the geothermal wellhead shown in FIG. 1 with certain portions of the wellhead shown in elevation;

FIG. 3 is an enlarged section of the tubing head and hanger connected to an auxiliary body portion of the geothermal wellhead; and FIG. 4 is a section taken generally along line 4—4 of FIG. 3.

DESCRIPTION OF THE INVENTION

Figure 1:
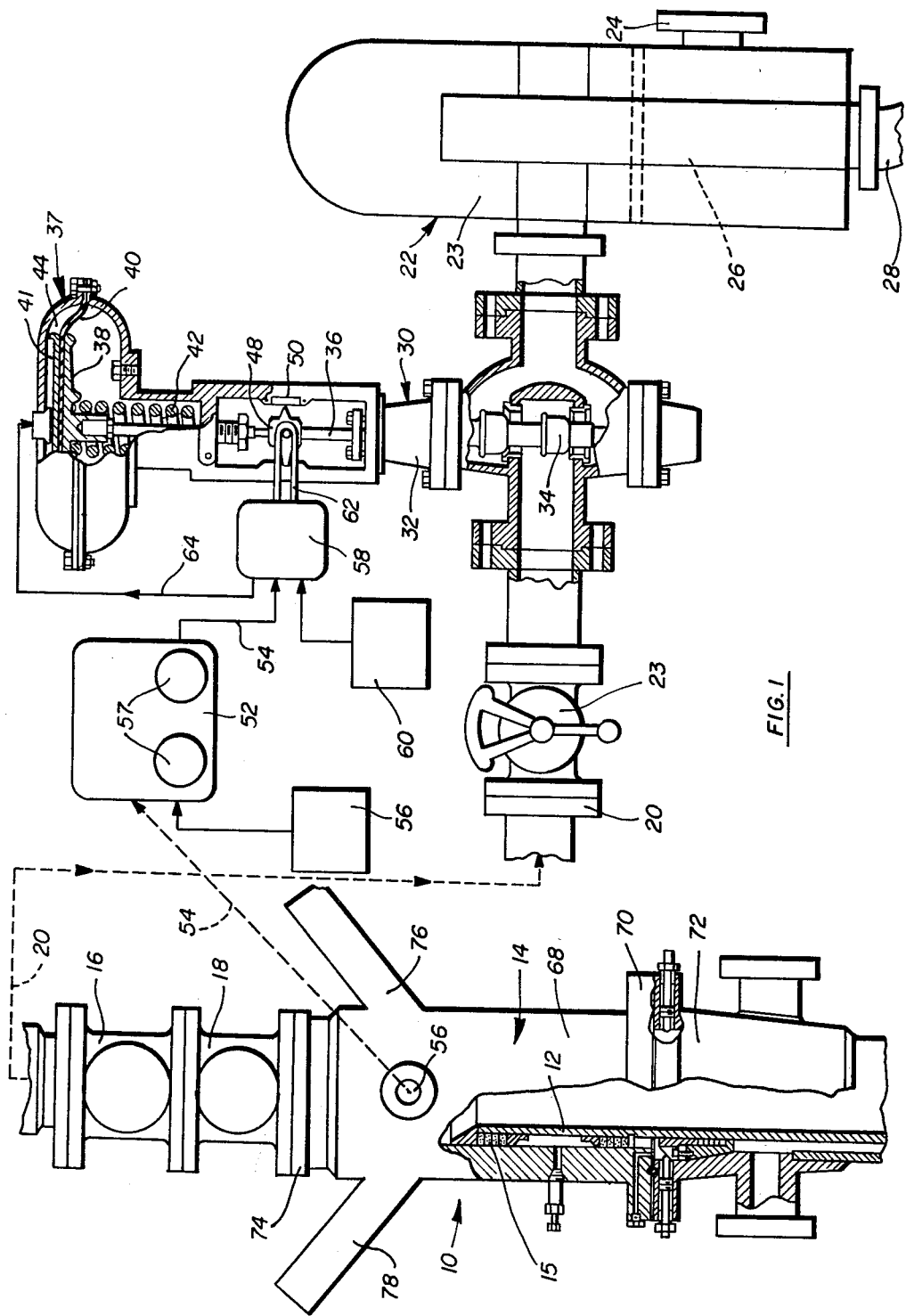
FIG. 1 is a schematic view of a geothermal production system including a primarily sectional view of the geothermal wellhead comprising the present invention.

Referring now to the drawings for a better understanding of this invention, the geothermal system is illustrated generally schematically in FIG. 1. The geothermal wellhead is indicated generally at 10 and has an inner casing 12 secured adjacent its lower end. The upper end of casing 12 is mounted within an expansion spool generally indicated at 14 and has a packing 15 mounted thereon for movement with upper end of casing 12. Upper and bottom master valves 16 and 18 are mounted above expansion spool 14 and the mixture of water and steam from the geothermal well flows from casing 12 to an outlet line 20 which extends to a steam separator 22. A gate valve 21 is placed in outlet line 20. Steam separator 22 may, for example, be of the cyclone type in which the incoming steam-water mixture impinges against the inside surface of the separator due to the centrifugal forces developed by the swirling motion of the fluid as its enters the separator vessel 23 which is a cylindrical tank. The water impinging against the inside surface of the vessel drains down the vessel wall into a water collection chamber and a water outlet conduit 24 removes the water. The less dense steam rises into a steam chamber located at the top of the separator vessel. A steam outlet conduit 26 directs the steam from separator vessel 23 through line 28. As an example of a steam separator which has been found to function satisfactorily with the present system, reference is made to copending application Ser. No. 031,722 filed Apr. 20, 1979, for William L. Godare and entitled "Baffle Plate for Cyclone Steam Separator".

To obtain best results and maximum efficiency from steam separator 22, it is desirable that a generally even flow of water and steam be provided for seaprator 22. In geothermal wells, the water-steam mixture in the well is constantly surging due to hot water flashes down the hole. To provide a generally even flow from the well, a control valve generally indicated at 30 is placed in line 20 to control the water-steam flow the steam separator 22. Control valve 30 includes a body 32 having a reciprocal valve plug 34 and a valve stem 36 connected to valve plug 34 adjacent its lower end. The upper end of stem 36 is secured to a lower diaphragm plate 38 of a pneumatic actuator indicated generally at 37. A flexible diaphragm 40 is clamped between lower plate 38 and upper plate 41. A spring 42 urges plate 38 and diaphragm 40 upwardly within a pneumatic chamber 44 of actuator 37. An indicator 48 is movable with stem 36 and a fixed scale 50 shows the position of valve plug 34.

A pneumatic pressure controller is shown at 52 and a pressure sensing line 54 extends from pressure controller 52 to opening 55 in wellhead 10 so that the pressure of the water-steam mixture flowing from wellhead 10 may be transmitted to controller 52. Controller 52 has a bourdon tube connected to the sensing point and controls the air output from pneumatic line 54. An air supply 56 provides air to pressure controller 52. Suitable supply and output gauges 57 are provided in pneumatic pressure controller 52.

A pneumatic valve positioner is shown at 58 and has a separate air supply at 60. Valve positioner 58 is a single acting control device having a feedback cam to position arm 62 in accordance with the air signal received from controller 52 through line 54. Air is fed or bled from positioner 58 through line 64 to the pneumatic actuator 37.

In operation, when a pressure lower than the predetermined range is sensed through line 54, the pneumatic signal from controller 52 to positioner 58 causes positioner 58 to bleed air from pneumatic actuator 37 so that spring 42 will move diaphragm 38 upwardly thereby to increase the opening of valve plug 34. When a pressure higher than the predetermined range is sensed through line 54, the pneumatic signal from controller 52 to positioner 58 causes positioner 58 to feed air to pneumatic actuator 37 so that diaphragm 38 will move downwardly to decrease the opening of valve plug 34. Thus, the flow to separator 22 can be equalized even though changes in the pressure of the water-steam mixture from wellhead 10 fluctuates.

Control valve 30 with pneumatic actuator 37, (Model No. 70-11-2) pneumatic pressure controller 52 (Model No. 72-14-1) and pneumatic valve positioner 58 (Model No. 70-20-5) are shown in Catalog ACV-1, parts 1 and 6, dated 1974 and may be obtained from the W-K-M Division of ACF Industries, Incorporated, Houston, Texas.

Expansion spool 14 has a main body 68 including a lower flange 70 connected to a casing hanger 72 and an upper flange 74 connected to lower master valve 18. Expansion spool 14 includes a pair of tubular auxiliary body portions 76 and 78 diverging from main body 68. Body portions 76 and 78 provide entrances to casing 10 and the well. Auxiliary body portion 76 has a lower gate valve 80 connected thereto. A tubing or casing head indicated generally at 82 is connected to lower gate valve 80 and an upper gate valve 84 is connected to tubing head 82. A removable closure plate 86 may be provided, if desired. Auxiliary body portion 76 is particularly adaptable for injection of chemicals and the like within casing 12 which might be necessary for breaking up crustations on the inner wall surface of the casing wall or for other purposes. A flexible tubing string is normally used for the injection of such chemicals and may be inserted through gate valve 84 upon removal of end plate 86.

Referring to FIGS. 3 and 4, tubing head 82 forms an inner bowl of a generally frusto-conical shape and a hanger 88 of a generally frusto-conical shape is mounted within tubing head 82. Hanger 88 has a central opening 90 therein and the inner periphery of opening 94 is threaded at 92. Flexible tubing indicated at 94 when set within tubing head 82 is externally threaded and hanger 88 is then threaded onto tubing 94. Thereafter the tubing 94 may be cut at the desired length above threading 92 and is thus suspended from hanger 88. Tubing head 82 and hanger 88 have respective facing mating surfaces 96 and 98 as indicated in FIG. 3. An adapter flange 100 is mounted over hanger 88 and tubing head 82. Gate valve 84 is connected to adapter flange 100. Adapter flange 100 and tubing head 82 have pairs of facing annular grooves indicated at 102 and 104. Groove 102 is formed at the juncture of hanger 88 and tubing head 82. Metal seals 106 are positioned in annular pairs of grooves 102, 104 to provide a tight metal sealing relation between adapter flange 100 and subjacent tubing head 82 and hanger 88. Holddown screws 109 fit within an outer annular groove in hanger 88 for securing hanger 88 in position.

A relatively large variation of temperature occurs during operation of the geothermal well and to assist in separation of hanger 88 from tubing head 82 which may be necessary for removal of tubing 94, a plurality of vertically extending flutes 108 are spaced about the outer peripheral surface 98 of hanger 88 and an annular groove 110 connects the lower end of flutes 108. A suitable fluid, such as a lubricant, may be inserted within groove 110 through fitting 112 having a closure cap 114 thereon. The insertion of fluids such as a lubricant, under pressure, tends to aid in separation of surfaces 96 and 98 to facilitate the removal of hanger 88 from tubing head 82.

Auxiliary body portion 78 has a gate valve 116 thereon with a "T" fitting 118 connected thereto. Gate valves 120 and 122 are also connected to "T" fitting 118 as shown in FIG. 2. Removable end closure plates 124 are provided for gate valves 120 and 122. Thus, an entrance is provided through auxiliary body portion 78 to the well for a test sample, if desired, or for other purposes such as in insertion of certain tools within the well.

What is claimed is:

1. An improved geothermal wellhead for a geothermal production system having a steam separator, a delivery line extending from the wellhead to the steam separator to provide a mixture of steam and water to the separator from the wellhead;

a pressure responsive control valve having a valve member mounted in said delivery line for movement between open and closed positions, and fluid pressure control means operatively connected between the wellhead and the control valve to effect movement of the valve member automatically in response to changes in fluid pressure in said wellhead;

said improved geothermal wellhead comprising a main body and a pair of integral auxiliary bodies diverging from said main body, a casing string mounted in said main body, a tubing hanger in one of said auxiliary bodies, and a flexible tubing supported from said tubing hanger and extending within said casing string mounted in said main body.

2. In a geothermal production system, a steam separator, a generally Y-shaped wellhead having a main body and a pair of integral auxiliary body portions diverging from the main body, a casing string mounted within said wellhead below said auxiliary body portions, a fluid supply line extending from said wellhead to said steam separator, a control valve in said supply line to control the fluid flow from the wellhead to the steam separator;

a tubing head in one of said auxiliary body portions, and a flexible tubing supported from said tubing head and extending within the casing string for the injection of selected fluids; the other auxiliary body portion being adapted to receive a test steam probe for acquiring a steam sample from the associated well.

3. In a geothermal production system as set forth in claim 2 wherein said tubing head forms an inner bowl of a generally frusto-conical shape and a hanger is mounted within the inner bowl to suspend the flexible tubing, an upper adapter flange is secured to the upper end of the hanger and tubing head, and a metal seal is positioned between the adapter flange and said hanger at the juncture of the hanger with the tubing head.

4. The sub-combination with a geothermal wellhead assembly which includes a main body having a central passage and at least two divergent passages with the divergent passages communicating with the central passage, of a tubing head assembly for at least one of the divergent passages com-comprising:
- a tubing head defining an inner bowl of a generally frustoconical shape, a hanger mounted within the tubing head having a central bore and a generally frusto-conical outer surface in facing supporting contact with the inner bowl;
- said hanger having teeth about the central bore therein for suspending flexible tubing therefrom;
- an upper adapter flange secured to the upper end of said hanger and said tubing head, and a pair of concentric metal seals mounted in grooves between the adapter flange, hanger and tubing head.

5. A geothermal wellhead comprising:
- a main body with a central passage therein, an integral diverging body portion connected to the main body and having a divergent passage communicating with the central passage, an auxiliary tubing head on said body portion, a tubing hanger suspended from said tubing head, said tubing hanger and tubing head having mating generally frusto-conical surfaces;
- an upper cover plate secured to the hanger, and a seal between the cover plate and the hanger at the juncture of the hanger and tubing head thereby to seal against any leakage between the tubing head and hanger.

6. A geothermal wellhead as set forth in claim 5, wherein said hanger has an annular groove about its outer periphery and a plurality of flutes extending upwardly from said annular groove, and an opening through the tubing head to said groove to permit the insertion of suitable fluid or the like within the groove and associated flutes to facilitate separation of the hanger from the tubing head.

* * * * *